US007330479B2

(12) United States Patent
Barker et al.

(10) Patent No.: US 7,330,479 B2
(45) Date of Patent: Feb. 12, 2008

(54) SHARED TRANSMIT BUFFER FOR NETWORK PROCESSOR AND METHODS FOR USING SAME

(75) Inventors: Kenneth J. Barker, Holly Springs, NC (US); Chad B. McBride, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/670,711

(22) Filed: Sep. 25, 2003

(65) Prior Publication Data

US 2005/0068974 A1    Mar. 31, 2005

(51) Int. Cl.
*H04L 12/56*  (2006.01)
*H04L 12/28*  (2006.01)
(52) U.S. Cl. ........................ 370/419; 370/235
(58) Field of Classification Search ............... None
See application file for complete search history.

(56) References Cited

U.S. PATENT DOCUMENTS

| 5,392,280 | A | * | 2/1995 | Zheng | 370/353 |
|---|---|---|---|---|---|
| 6,031,821 | A | * | 2/2000 | Kalkunte et al. | 370/235 |
| 6,807,640 | B2 | * | 10/2004 | Fischer | 713/600 |
| 2002/0128812 | A1 | * | 9/2002 | Gooding et al. | 703/23 |
| 2002/0159460 | A1 | * | 10/2002 | Carrafiello et al. | 370/392 |
| 2004/0088469 | A1 | * | 5/2004 | Levy | 710/316 |
| 2004/0257995 | A1 | * | 12/2004 | Sandy et al. | 370/235 |
| 2005/0013250 | A1 | * | 1/2005 | Kauschke et al. | 370/235 |

* cited by examiner

*Primary Examiner*—Edan Orgad
*Assistant Examiner*—Blanche Wong
(74) *Attorney, Agent, or Firm*—Dugan & Dugan

(57) ABSTRACT

In a first aspect, a first method is provided for controlling the flow of data between a first and second clock domain. The first method includes the steps of (1) selecting one of a plurality of ports included in a physical layer interface in the second clock domain to which to send data; and (2) transmitting data from a transmit buffer in the first clock domain to the selected port in the physical layer interface in the second clock domain. Numerous other aspects are provided.

3 Claims, 4 Drawing Sheets

SHARED TRANSMIT BUFFER FOR NETWORK PROCESSOR AND METHODS FOR USING SAME

FIELD OF THE INVENTION

The present invention relates generally to network processors, and more particularly to a shared transmit buffer for a network processor and methods for using the same.

BACKGROUND

A network processor may include a memory for receiving and storing data provided to the network processor. The memory may be coupled to one or more physical layer interfaces via a memory subsystem (e.g., a transmit buffer) and a link layer device, such as a network controller, for example, included in the network processor. In a conventional network processor a separate transmit buffer is provided for each physical layer interface and, the network processor transmits data for a port from the memory to the transmit buffer associated with the physical layer interface that includes the port. Thereafter, the transmit buffer transmits the data to the port via one of a plurality of physical layer devices included in the physical layer interface. The physical layer device may include an internal buffer for storing data received from the transmit buffer.

The network processor typically may receive data for one or more of the ports independently of the availability of the one or more ports. Likewise, one or more of the ports may be available to receive data independently of whether the network processor receives data for the one or more ports.

Multiple ports typically may share a physical layer interface. More specifically, the packets to be transmitted to the multiple ports, respectively, are interleaved such that each port may transmit a portion of a corresponding packet during the same time frame. However, only one port may use the physical layer interface at a time (e.g., to receive data from the transmit buffer corresponding to the physical layer and/or to transmit data from the network processor). Therefore, if the amount of data transmitted from a transmit buffer to the one or more ports is managed improperly, the network processor may inaccurately and/or inefficiently transmit data from the one or more ports.

More specifically, if a transmit buffer sends data to a port included in a physical layer device, and the data causes an internal buffer corresponding to a port of the physical layer device to exceed a first predetermined level (e.g., a high watermark), the physical layer device may notify the transmit buffer to stop sending data to the physical layer device until enough data of the internal buffer has been transmitted from the port to accommodate the new data. While the port is transmitting data and reducing the amount of data stored in the internal buffer corresponding to the port, the remaining ports included in the physical layer device stall (e.g., may not transmit data). Such stalling may cause one or more of the remaining ports to underrun (e.g., during the transmission of a data frame or cell, a port may not receive an expected portion of the data frame or cell in a timely fashion). Because of an underrun, data may be inaccurately transmitted from a port and must be retransmitted. Such a retransmission of data consumes bandwidth that otherwise may be used for transmitting other data, thereby causing a loss of effective bandwidth on the line.

Likewise, if the data transmitted from a transmit buffer to the physical layer device is excessively managed, the transmission of data may not be pipelined, resulting in inefficient use of transmit buffer bandwidth. For example, in an attempt to avoid causing an underrun, single-threading of a packet may be used such that an entire packet is transmitted to a port before another packet is transmitted to another port. Because the packets to be transmitted to the ports, respectively, are not interleaved, only one packet is transmitted at a time which results in an inefficient use of transmit buffer bandwidth.

SUMMARY OF THE INVENTION

To overcome the disadvantages of the prior art, in one or more aspects of the invention, a shared transmit buffer for a network processor and methods for using the same are provided. For example, in a first aspect of the invention, a first method is provided for controlling the flow of data between a first and second clock domain. The first method includes the steps of (1) selecting one of a plurality of ports included in a physical layer interface in the second clock domain to which to send data; and (2) transmitting data from a transmit buffer in the first clock domain to the selected port in the physical layer interface in the second clock domain.

In a second aspect of the invention, a second method is provided for controlling the flow of data from a first clock domain to another clock domain. The second method includes the steps of (1) selecting one of a plurality of ports included in one of a plurality of physical layer devices included in one of a plurality of physical layer interfaces to which to send data, each of the plurality of physical layer devices operating in the other clock domain; (2) transmitting data for the selected port from a first buffer operating in the first clock domain to an asynchronous buffer, the asynchronous buffer corresponding to the one of the plurality of physical layer interfaces; (3) transmitting the data from the asynchronous buffer to the physical layer device that includes the selected port; and (4) transmitting the data from the selected port. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

Figure 1:
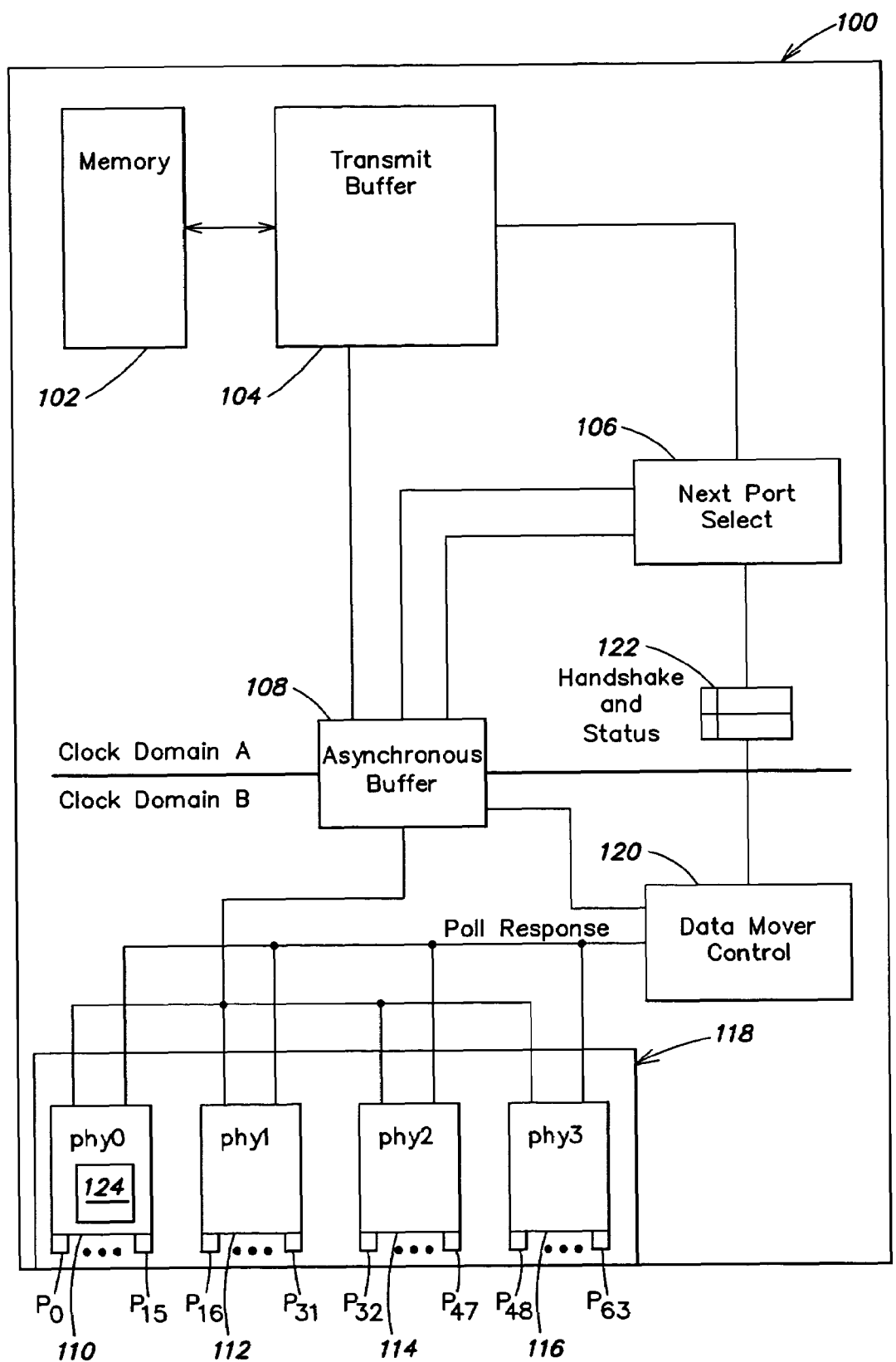
FIG. 1 is a block diagram of an exemplary network processor in which the present invention may be implemented.

FIG. 1 is a block diagram of an exemplary network processor 100 in which the present invention may be implemented. The network processor 100 may include a memory 102 (e.g., an SRAM or DRAM) coupled to a memory subsystem, such as a transmit buffer 104. In one embodiment, the memory 102 may be external to the network processor 100.

The transmit buffer 104 is coupled to next port select logic 106 and an asynchronous buffer 108. In one or more embodiments, the asynchronous buffer 108 may be smaller in size than the transmit buffer 104. The asynchronous buffer 108 is coupled to one or more physical layer devices 110-116 included in a physical layer interface 118. Each physical layer device 110-116 may be coupled to a plurality of output ports. In the embodiment shown, the physical layer interface 118 includes four physical layer devices 110-116 each of which includes sixteen ports $P_0$-$P_{15}$, $P_{16}$-$P_{31}$, $P_{32}$-$P_{47}$, $P_{48}$-$P_{63}$, respectively. Other numbers of physical layer devices and/or number of ports per physical layer device may be employed.

Data mover control logic 120 is coupled to one or more of the ports $P_0$-$P_{63}$ included in the physical layer interface 118 via one or more of the physical layer devices 110-116, to the asynchronous buffer 108, and to the next port select logic 106 (via handshake and status logic 122). The memory 102, transmit buffer 104, asynchronous buffer 108, next port select logic 106, handshake and status logic 122, and data mover control logic 120 may be included in a link layer interface (e.g., a network controller which is not separately shown) which transmits data to the physical layer interface 118 from which the data is transmitted from the network processor 100.

Because the network processor 100 may be connected to a high-speed network connection (e.g., OC-3), the network processor 100 may receive and store data in the memory 102 at a high speed. The data may be transmitted from the memory 102 at a high speed to make room in the memory 102 for newly received data. In one embodiment, data may be transmitted from the memory 102 at a speed of 10 Gbps. Other speeds may be employed. The data may be of varying protocols (e.g., ATM, Ethernet, Packet over SONET, etc.). Data from other protocols may be received by the memory 102. The memory 102 may be included in a first clock domain (e.g., clock domain A) of the network processor 100 so that data may be received and/or transmitted from the memory 102 at the clock speed of clock domain A.

The transmit buffer 104 may receive data (e.g., streams of data traffic) from the memory 102, store the data, and transmit the data to the asynchronous buffer 108. As shown, the transmit buffer 104 is included in the first clock domain (clock domain A). Therefore, data may be transmitted from the transmit buffer 104 to the asynchronous buffer 108 at the clock speed of clock domain A.

The asynchronous buffer 108 may receive data for a port $P_0$-$P_{63}$ from the transmit buffer 104, store the data, and transmit the data from the network processor 100 using the physical layer interface 118. More specifically, the asynchronous buffer 108 may transmit the data to a physical layer device 110-116, which includes the port $P_0$-$P_{63}$, in the physical layer interface 118. As shown in FIG. 1, the asynchronous buffer 108 spans two clock domains included in the network processor 100 (e.g., clock domain A and clock domain B), and may receive data at a first speed (e.g., the clock speed of clock domain A) and transmit data at the second speed (e.g., the clock speed of clock domain B). In one embodiment, the speed of clock domain A is greater than the speed of clock domain B (e.g., 200 MHz versus 50 MHz although other speeds may be employed).

Each physical layer device 110-116 of the physical layer interface 118 may receive and store data for a port ($P_0$-$P_{63}$) using an internal buffer 124 corresponding to the port $P_0$-$P_{63}$. Thereafter, the physical layer device 110-116 may transmit the data from the internal buffer 124 to the port $P_0$-$P_{63}$ from which the data is transmitted from the network processor 100. In one embodiment, each physical layer device 110-116 includes a 256-byte internal buffer 124 for each port (e.g., $P_0$-$P_{63}$) included in the physical layer device 110-116. Other sizes may be employed.

The data mover control logic 120 may determine which ports $P_0$-$P_{63}$ included in the physical layer interface 118 may receive data to be transmitted from the network processor 100 and transmit information, such as the results of the determination, to the next port select logic 106 via the handshake and status logic 122. The data mover control logic 120 may be included in the second clock domain (e.g., clock domain B), and therefore may receive and transmit data at the clock speed of clock domain B. The data mover control logic 120 may be implemented, for example, via combinational, and/or sequential logic or as an application specific integrated circuit (ASIC). Exemplary structure of the data mover control logic 120 will be described later with reference to FIG. 4.

The handshake and status logic 122 provides a mechanism (e.g., a polling mechanism) for determining which ports $P_0$-$P_{63}$ in the physical layer interface 118 may receive data to be transmitted from the network processor 100 and provides an indication (e.g., a signal) that a port $P_0$-$P_{63}$ is available to receive data in response to such polling. The handshake and status logic 122 may provide an indication (e.g., a start of cell (SOC) signal) to a physical layer device 110-116 of the start of transmission of data (e.g., a cell or frame) to a port $P_0$-$P_{63}$ and an indication (e.g., an end of cell signal) to the network processor 100 of the end of transmission of the data to the port $P_0$-$P_{63}$. The handshake and status logic 122 may implement an ATM Forum Utopia Level 2 Version 1.0 or PMC Sierra POS-PHY Level 2 interface protocol. Other interface protocols may be used.

The next port select logic 106 may (1) select a port $P_0$-$P_{63}$ to which to send data based on the information received from the data mover control logic 120 (via the handshake and status logic 122) and (2) transmit data for the selected port $P_0$-$P_{63}$ from the transmit buffer 104 to the physical layer interface 118 via the asynchronous buffer 108. The next port select logic 106 may be included in the first clock domain (e.g., clock domain A) of the network processor 100 so that data is transmitted from the next port select logic 106 at the clock speed of clock domain A. The next port select logic 106 may include logic, such as combinational and/or sequential logic or may be implemented as an ASIC. Exemplary structure of the next port select logic 106 will be described later with reference to FIG. 4.

In one or more embodiments, the transmit buffer 104 may be shared by a plurality of physical layer interfaces 118 (only one shown in FIG. 1) and may transmit data to physical layer devices included in each of the plurality of physical layer interfaces 118. The network processor 100 may include a separate asynchronous buffer 108, data mover control logic 120, and next port select logic 106 that correspond to each physical layer interface 118. However, unlike conventional network processors, only one transmit buffer 104 is required. Accordingly, the network processor 100 of the present invention may accurately and efficiently transmit data while reducing the chip area as described further below.

Figure 2:
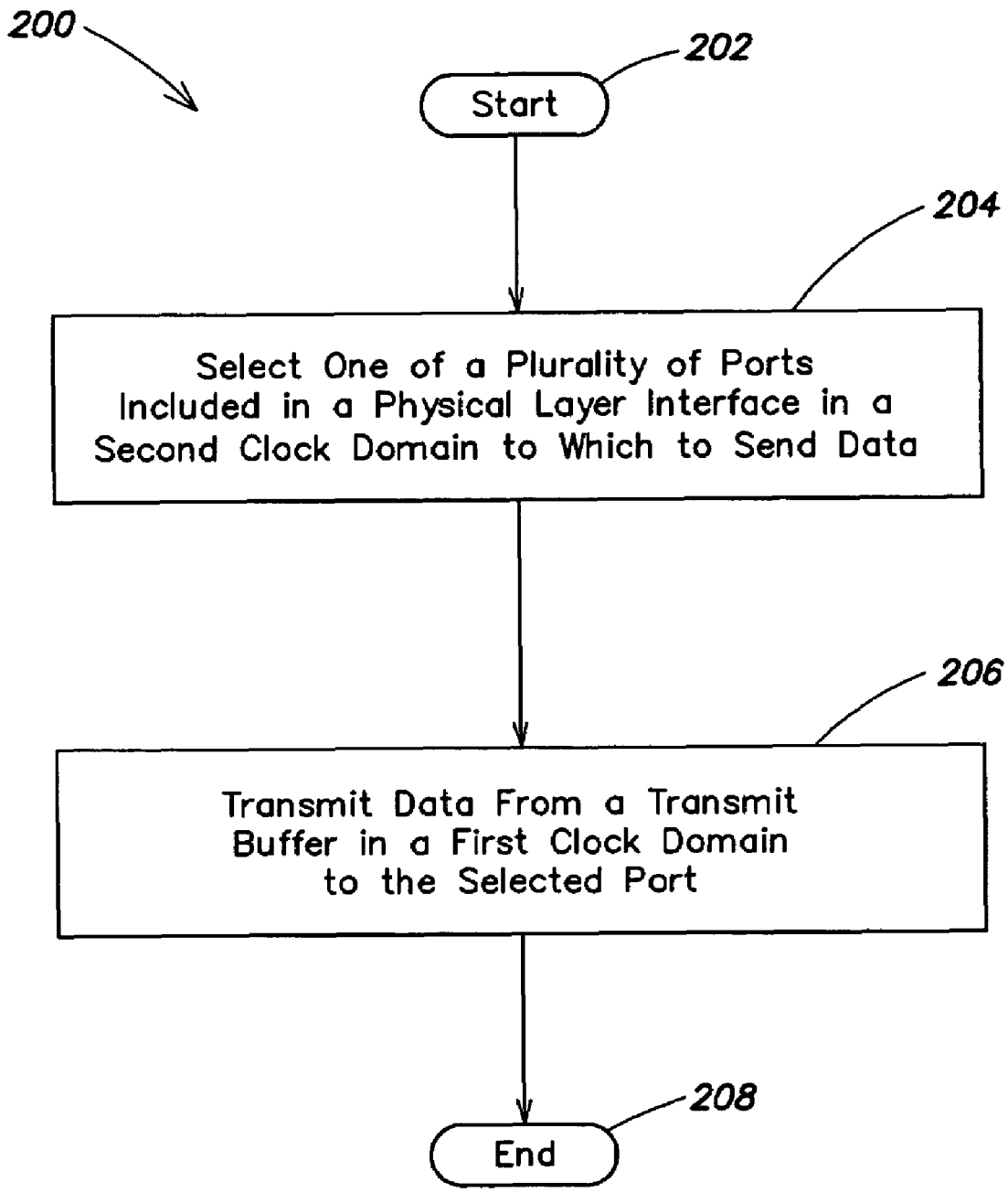
FIG. 2 illustrates an exemplary method for controlling the flow of data between a first and second clock domain in accordance with the present invention.

The operation of the novel network processor 100 is now described with reference to FIG. 1, and with reference to FIG. 2 which illustrates an exemplary method 200 for controlling the flow of data between a first and second clock domain. With reference to FIG. 2, in step 202, the method 200 of FIG. 2 begins. In step 204, one of a plurality of ports included in a physical layer interface in a second clock domain to which to send data is selected. For example, the data mover control logic 120 may determine whether one or more of the ports (e.g., $P_0$-$P_{63}$) included in one of the plurality of physical layer devices 110-116 of the physical layer interface 118 are available to receive data or a data mover control logic (not shown) corresponding to another physical layer interface (not shown) may make such a determination. A port $P_0$-$P_{63}$ may be available to receive data if the internal buffer 124 corresponding to the port $P_0$-$P_{63}$ is below a first predetermined level (e.g., a high watermark or other level indicator). If a port $P_0$-$P_{63}$ is not available to receive data, the port $P_0$-$P_{63}$ may begin to reduce the data stored in the internal buffer 124 corresponding to the port $P_0$-$P_{63}$ to make room for new data. During this time, the network processor may wait for the internal buffer 124 to make room for the new data before transmitting data to the port $P_0$-$P_{63}$ and may not transmit data from the transmit buffer 104 to another port $P_0$-$P_{63}$ included in the same physical layer device 110-116. As a result, data for the port in the transmit buffer may be overwritten and the other ports $P_0$-$P_{63}$ may run out of data to transmit, and therefore underrun. As stated, an underrun occurs if data is not received by a port $P_0$-$P_{63}$ when expected during a data transmission. Consequently, the data is transmitted inaccurately and must be retransmitted.

The data mover control logic 120 sends the results of the above determination to the next port select logic 106 via the handshake and status logic 122. The next port select logic 106 then selects one port $P_0$-$P_{63}$ included in a physical layer device 110-116 to which to send data based on the results of the determination received from the data mover control logic 120. Because the network processor 100 determines whether a selected port is available to receive data prior to transmitting data to the port $P_0$-$P_{63}$, the transmission of data to the selected port $P_0$-$P_{63}$ does not cause a stall and/or an underrun to one or more of the remaining ports $P_0$-$P_{63}$ included in the physical layer device 110-116. Note that because the next port select logic 106 is included in the first clock domain, the port $P_0$-$P_{63}$ (included in the physical layer device 110-116 in the second domain) to which to send data is selected in the first clock domain (e.g., at a faster clock speed than if the next port select logic 106 operated in the second clock domain.

In step 206, data from a transmit buffer in the first clock domain is transmitted to the selected port in the physical layer interface in the second clock domain. For example, data may be transmitted from the transmit buffer 104 in the first clock domain to the selected port $P_0$-$P_{63}$ in the second clock domain via the asynchronous buffer 108 and a physical layer device 110-116. Because the first clock domain may be faster than the second clock domain and the transmit buffer 104 is included in the first clock domain, the bandwidth of the transmit buffer 104 is larger than if the transmit buffer 104 were located in the second (e.g., slower) clock domain. A faster transmission of data from the transmit buffer 104 to the asynchronous buffer 108 results, and data may be transmitted from the network processor 100 in an accurate and efficient manner. In step 208, the method 200 of FIG. 2 ends.

Figure 3:
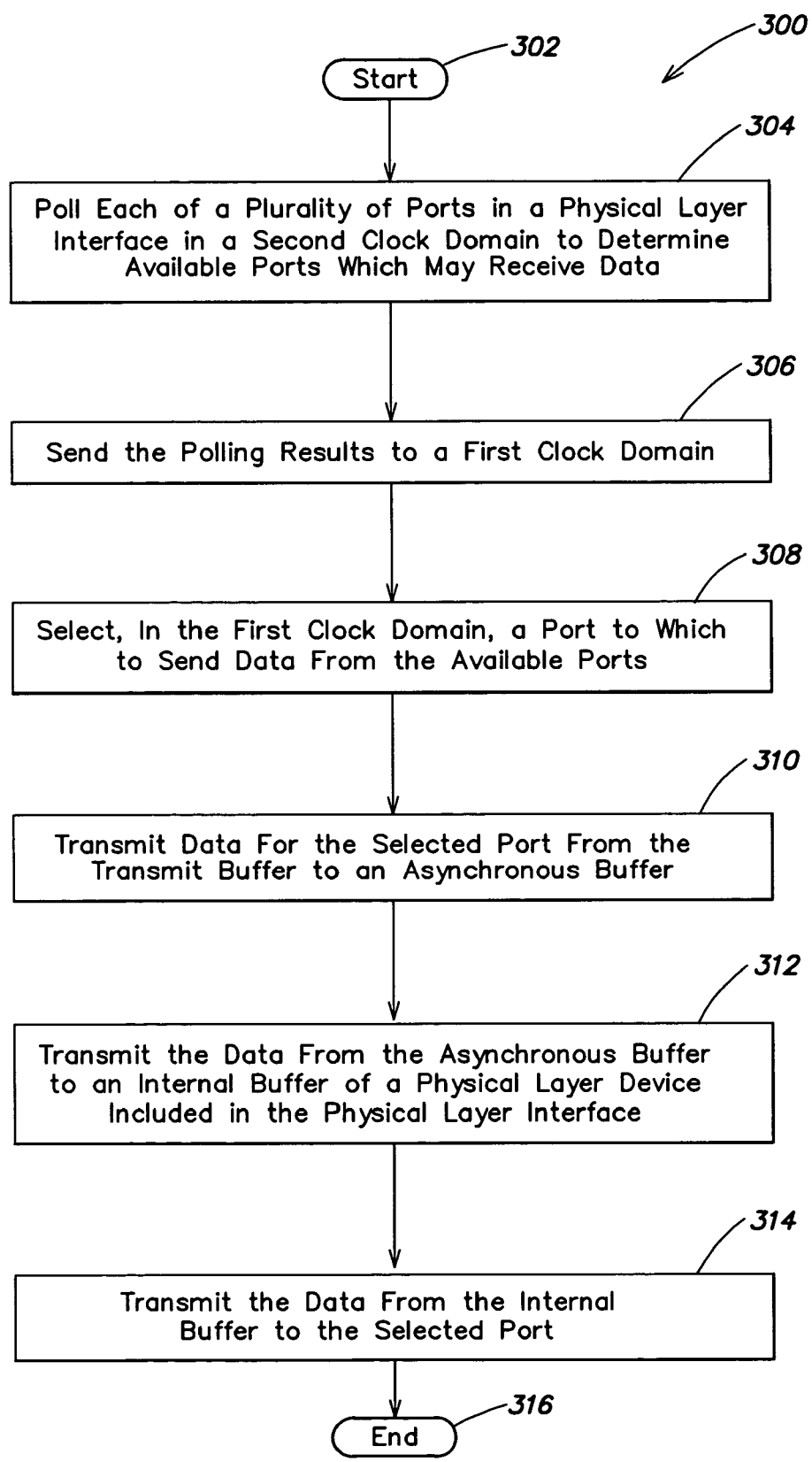
FIG. 3 illustrates a more detailed exemplary method for controlling the flow of data between a first and second clock domain in accordance with the present invention.

FIG. 3 illustrates an exemplary method 300 for controlling the flow of data between a first and second clock domain in accordance with the present invention. With reference to FIG. 3, in step 302, the method 300 of FIG. 3 begins. In step 304, each of a plurality of ports $P_0$-$P_{63}$ in a physical layer interface 118 in the second clock domain is polled to determine which ports $P_0$-$P_{63}$ are available to receive data. Handshake and status logic 122 may provide a mechanism for making such a determination, such as a multiplexed-status polling or direct status indication mechanism, for the network processor 100. If the network processor 100 uses a multiplexed status-polling mechanism, one or more ports $P_0$-$P_{63}$ coupled to each of the physical layer devices 110-116 in a physical layer interface 118 is polled using the same bus to determine which ports $P_0$-$P_{63}$ are available to receive data. For example, while data is being transmitted to port $P_0$, ports $P_1$-$P_{63}$ may be polled to determine whether they are available to receive data. Alternatively, if the network processor 100 uses a direct status indication mechanism, each physical layer device 110-116 may indicate whether the physical layer device 110-116 has space available in its internal buffer 124 to receive data using a signal to the link layer device.

Assuming a multiplexed status polling mechanism is used, the ports $P_0$-$P_{63}$ that are not receiving data are polled to determine whether each port has space available in its internal buffer 124. As stated, each physical layer device 110-116 includes an internal buffer 124 corresponding to each port $P_0$-$P_{63}$ coupled to the physical layer device 110-116. A user may individually configure each internal buffer 124 to include a first and second threshold (e.g., high and low watermarks). If the data stored in the internal buffer 124 corresponding to a port $P_0$-$P_{63}$ is below the first threshold (e.g., a high watermark), the port $P_0$-$P_{63}$ is available to receive data. More specifically, data may be stored in the internal buffer 124 corresponding to the port $P_0$-$P_{63}$. If a port $P_0$-$P_{63}$ is available when polled, the physical layer device 110-116 which includes the port $P_0$-$P_{63}$ will respond to the poll by sending an indication of the port's availability (e.g., a poll response) to the data mover control logic 120.

Likewise, if the data stored in the internal buffer 124 corresponding to the port $P_0$-$P_{63}$ is above the first threshold, the port $P_0$-$P_{63}$ is unavailable to receive data. Any additional data transmitted to the transmit buffer 104 corresponding to the port $P_0$-$P_{63}$ may overwrite data previously stored in the transmit buffer 104. When polled, the physical layer device 110-116 which includes the port $P_0$-$P_{63}$ will respond to the poll by sending an indication of the port's unavailability (e.g., a poll response) to the data mover control logic 120. If the data stored in the internal buffer 124 corresponding to a port $P_0$-$P_{63}$ is above the first threshold, the port $P_0$-$P_{63}$ may reduce (e.g., by transmitting data from the port $P_0$-$P_{63}$) the data stored in the internal buffer 124 until the data is below the second threshold. Once the data stored in the internal buffer 124 corresponding to the port $P_0$-$P_{63}$ is below the second threshold, the port $P_0$-$P_{63}$ may notify the network processor 100 via the handshake and status logic 122 that the port $P_0$-$P_{63}$ is available to receive data.

All ports $P_0$-$P_{63}$ may be polled in a similar manner. The data mover control logic 120 may receive and store a poll response from each of the ports $P_0$-$P_{63}$. Because one or more of the ports $P_0$-$P_{63}$ may be continuously (e.g., once every predetermined number of clock cycles) polled, the data mover control logic 120 may continuously receive poll responses from the ports $P_0$-$P_{63}$. The data mover control logic 120 stores the polling responses received after a predetermined amount of data is transmitted from the asynchronous buffer 108 to a previously selected port $P_0$-$P_{63}$ (via a physical layer device 110-116) from a previous transmission of data. A user may adjust the value of the predetermined amount of data to ensure the accuracy of the polling responses. For example, the predetermined amount of data may be nearly the entire previous data transmission. Therefore, the polling responses that are stored by the data mover control logic 120 will reflect the availability of the ports $P_0$-$P_{63}$ prior to a next data transmission.

Alternatively, the data mover control logic 120 may store the polling responses received from the ports $P_0$-$P_{63}$ when an indication, such as a signal, is received from the physical layer device 110-116 that the internal buffer 124 (e.g., a first-in first-out buffer (FIFO)) corresponding to a port $P_0$-$P_{63}$ to which data is being transmitted is empty. As will be described below, in such a manner, the polling responses may be used for determining ports available to receive data. The selection of a port for receiving data may be based on which ports are available for receiving data and/or a round robin selection algorithm. As stated, the physical layer interface 118 that includes the port $P_0$-$P_{63}$ and the data mover control logic 120 are included in the second clock domain of the network processor 100. Therefore, each of the ports $P_0$-$P_{63}$ is polled by the data mover control logic 120 and responds to the poll at the clock speed of the second clock domain (clock domain B).

In step 306, the polling results are sent to the first clock domain. The data mover control logic 120 may send the polling response received from each of the ports $P_0$-$P_{63}$ to the next port select logic 106 (e.g., via the handshake and status logic 122). The polling responses may be transmitted from the data mover control logic 120 to the next port select logic 106 every predetermined number of clock cycles of the first clock domain (clock domain A). Because the next port select logic 106 is in a first clock domain and the data mover control logic 120 is in the second clock domain, the polling responses from the ports $P_0$-$P_{63}$ are transmitted across a clock domain boundary.

In step 308, a port to which to send data is selected, in the first clock domain, from the available ports included in the physical layer interface in the second clock domain. More specifically, based on the polling responses received from the data mover control logic 120 (via the handshake and status logic 122), the next port select logic 106 is notified which of the ports $P_0$-$P_{63}$ included in the physical layer interface 118 are available to receive data. The next port select logic 106 then may select one of the available ports to which to send data. The next port select logic 106 may use a selection algorithm, such as round robin or the like, to select an available port to which to send data. If the round robin selection algorithm is used, the next port select logic 106 may select an available port $P_0$-$P_{63}$ to which to send data based on a previous port $P_0$-$P_{63}$ to which data was sent. For example, if data was most recently transmitted to port 10, and the next port select logic 106 is notified that ports 2, 11, and 12 are available to receive data, the next port select logic 106 may select port 11 to which to send data.

As stated, the next port select logic 106 is included in the first clock domain and the ports $P_0$-$P_{63}$ are included in the second clock domain. Therefore, in step 308, a decision is made in the first clock domain to send data to a port in the second clock domain.

In step 310, data for the selected port is transmitted from the transmit buffer to an asynchronous buffer (e.g., the asynchronous buffer 108). For example, the next port select logic 106 may provide an address in which data for the selected port $P_0$-$P_{63}$ is stored to the transmit buffer 104. In response, data stored in that address of the transmit buffer 104 is output on a data line. The next port select logic 106 may provide an address and write a signal to the asynchronous buffer 108. The data output to the data line by the transmit buffer 104 is input by and stored in that address of the asynchronous buffer 108. Because the transmit buffer 104 is included in the first clock domain, data for the selected port $P_0$-$P_{63}$ may be transmitted from the transmit buffer 104 to the asynchronous buffer 108 at the speed of the clock of the first clock domain. Assuming the first clock domain operates faster than the second clock domain, including the transmit buffer 104 in the first clock domain provides a faster transmission of data from the transmit buffer 104.

In step 312, data for the selected port is transmitted from the asynchronous buffer 108 to an internal buffer 124 of a physical layer device, which includes the selected port, included in the physical layer interface 118. As stated, each physical layer device 110-116 included in the physical layer interface 118 includes an internal buffer 124 for each of the ports (e.g., $P_0$-$P_{15}$) included in the physical layer device 110-116. Therefore, data for the selected port is transmitted from the asynchronous buffer 108 to the internal buffer 124 for the selected port. The next port select logic 120 transmits the data for the selected port from the asynchronous buffer 108 to the physical layer device 110-116 that includes the selected port at the speed of the clock in the second clock domain. Because the data is transmitted to a port $P_0$-$P_{63}$ that is predetermined to be available to receive data, the risk of causing a stall on a port $P_0$-$P_{63}$ by transmitting too much data to the internal buffer 124 corresponding to the port $P_0$-$P_{63}$ or an underrun on other ports $P_0$-$P_{63}$ as a result of the stall is reduced. In one embodiment, 64 bytes of data (e.g., a POS-PHY burst) may be transmitted to a selected port.

Although the data mover control logic 120 continues to receive a poll response from each of the ports $P_0$-$P_{63}$ included in the physical layer interface 118, the value of the poll responses will not be stored by the data mover control logic 120 during a transmission of an initial predetermined portion of the data for the selected port $P_0$-$P_{63}$ from the asynchronous buffer 108 to the internal buffer 124 of the physical layer device corresponding to the selected port $P_0$-$P_{63}$. During this time the data mover control logic 120 stores a reset value (e.g., zero) as the poll response for each of the ports $P_0$-$P_{63}$. The reset value indicates that a port is unavailable to receive data. Once the initial predetermined portion of the data transmission is completed, the data mover control logic 120 stores the polling results received from the physical layer devices 110-116. In this manner, the next port select logic 106 may not receive new polling responses that indicate ports are available to receive data and thereafter select a new port to which to send data until the transmission of data to the selected port is nearly completed. The value of the predetermined portion may be stored in a register, and will be described in detail with reference to FIG. 4.

In step 314, the data for the selected port is transmitted from the internal buffer of the physical layer device to the selected port. The data is then transmitted from the network processor 100 via the selected port. As data is transmitted from the internal buffer 124 the amount of data stored in the internal buffer 124 may fall below a first and/or second threshold. Once the amount of data stored in the internal buffer 124 falls below the second threshold, the port is available to receive data. In response, the port may indicate its availability to receive data in subsequent polling responses.

In step 316, the method 300 of FIG. 3 ends. Through use of the method of FIG. 3, the flow of data from a first clock domain to a second clock domain is controlled. Data may be transmitted to ports $P_0$-$P_{63}$ when necessary such that the ports do not underrun while transmitting data. More specifically, enough data may be transmitted to a selected port such that the selected port does not need additional data until the port is selected again to receive data. Further, data is not transmitted to ports that are not available to receive data such that a stall on the ports is avoided. Also, by using the present invention, the transmission of data from the transmit buffer 104 to a physical layer interface 118 via an asynchronous buffer 108 will not be excessively managed, and may therefore be pipelined. In contrast to the single-threading method of transmitting data, in which only one port may transmit data during a time frame, by interleaving the packets transmitted from the transmit buffer 104 to the ports $P_0$-$P_{63}$, respectively, the present invention allows each port $P_0$-$P_{63}$ to transmit a portion of a corresponding packet during the same time frame, which results in an efficient use of the transmit buffer bandwidth.

By including the transmit buffer 104 in the first clock domain, the transmit buffer 104 may be shared by a plurality of physical layer interfaces 118, each of which includes a plurality of physical layer devices coupled to a plurality of ports. Each of the physical layer interfaces 118 may be coupled to the transmit buffer 104 via a different asynchronous buffer 108 and may be included in a clock domain different from the first clock domain (e.g. another clock domain, such as a second clock domain, third clock domain, etc.). Therefore, using a single transmit buffer 104, data may be received by the network processor 100 and transmitted from the memory 102 to an asynchronous buffer 108 via the transmit buffer 104 at the speed of the first clock domain and transmitted from the network processor 100 (via the asynchronous buffer 108 and a physical layer interface 118) at the speed of another clock domain (e.g., a second clock domain, third clock domain, etc.). Employing a single transmit buffer 104 that may be shared by a plurality of physical layer interfaces 118 provides a savings in chip floor plan area over methods and apparatus that include a separate transmit buffer 104 for each physical layer interface 118.

Figure 4:
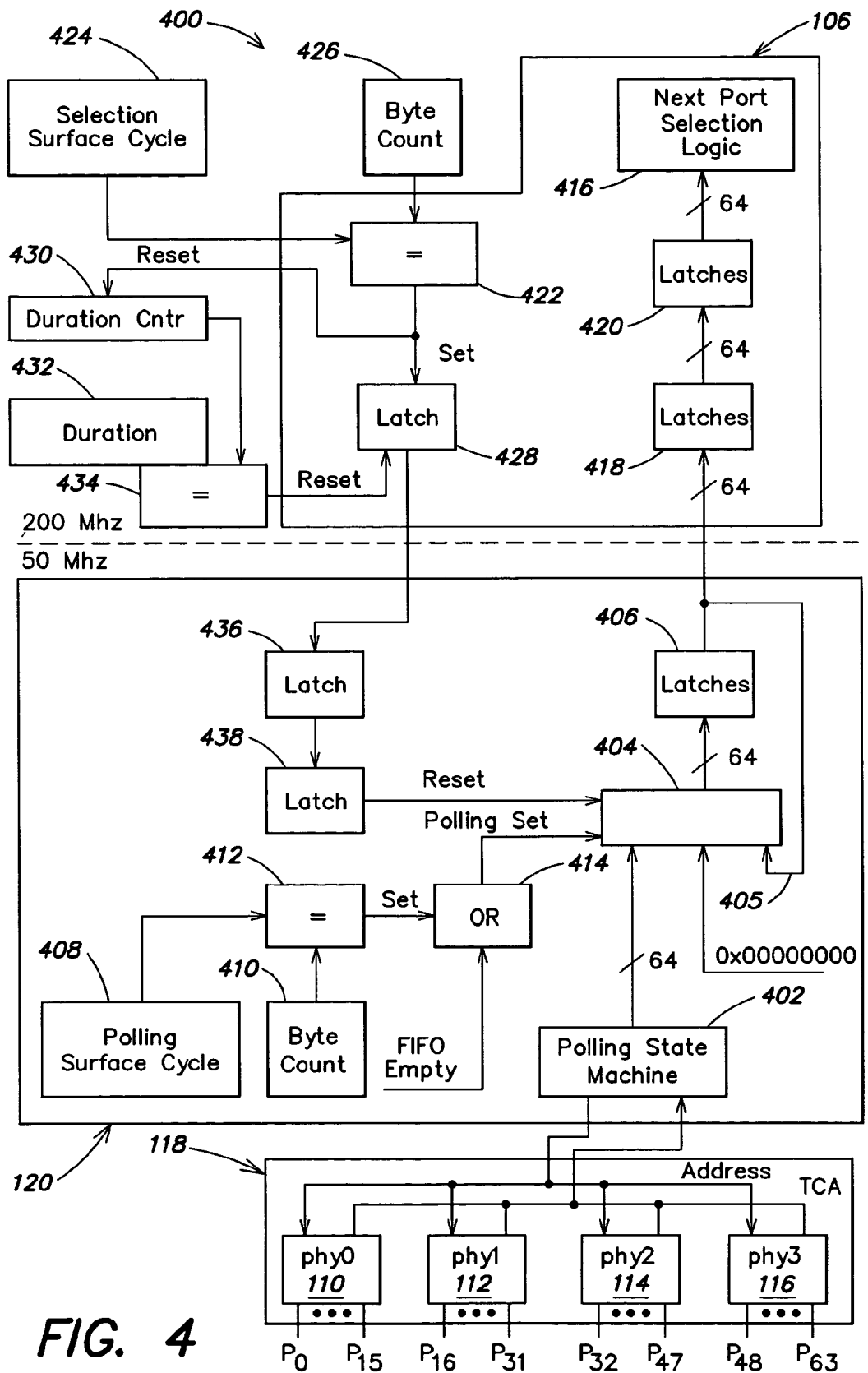
FIG. 4 is a schematic diagram of exemplary structure of the data mover control logic and the next port select logic of FIG. 1.

Exemplary structure of the data mover control logic 120 and the next port select logic 106 will now be described with reference to FIG. 4. As stated, the data mover control logic 120 may be coupled to a physical layer interface 118 and next port select logic 106 via handshake and status logic (not shown in FIG. 4).

The data mover control logic 120 may include a polling state machine 402 for polling each of the ports $P_0$-$P_{63}$ included in the physical layer interface 118. The polling state machine 402 may send a poll to the address of a port $P_0$-$P_{63}$ from each physical layer device 110-116 included in the physical layer interface 118 during a clock cycle. During each subsequent clock cycle, the polling state machine 402 may send a poll to another port $P_0$-$P_{63}$ from each physical layer device 110-116 until each of the ports $P_0$-$P_{63}$ included in the physical layer interface 118 has been polled. Because in the embodiment shown the physical layer interface 118 includes four physical layer devices 110-116 each of which includes sixteen ports, the polling state machine 402 may poll all the ports $P_0$-$P_{63}$ in sixteen clock cycles. Another number of clock cycles may be used to poll the ports. In response to a poll, an available port $P_0$-$P_{63}$ may send an indication (e.g., a transmit cell available (TCA) signal) to the polling state machine 402. Otherwise, the port $P_0$-$P_{63}$ is unavailable to receive data.

In one embodiment, the polling state machine 402 may output a bit representing a polling response for each port $P_0$-$P_{63}$ that is polled. For example, if sixty-four ports are polled, the polling state machine 402 outputs sixty-four bits (e.g., a sixty-four bit vector). Another number of bits may be used to represent a polling response. The value of each bit corresponds to a port and indicates whether the port $P_0$-$P_{63}$ is available to receive data. For example, if a bit corresponding to a port is of a high logic state (e.g., a logic "1"), the port is available to receive data. However, if the bit corresponding to the port is of a low logic state (e.g., a logic "0"), the port is unavailable to receive data. The polling state machine 402 may be coupled to a multiplexer 404 used to selectively output data. More specifically, the data (e.g., polling responses) output by the polling state machine 402 may be input by the multiplexer 404 as data. Alternatively, reset data (e.g., a bit of a low logic state corresponding to each port $P_0$-$P_{63}$ included in the physical layer interface 118) may be input by the multiplexer 404 as data, or data previously output by the multiplexer 404 may be input (via a feedback loop 405) by the multiplexer 404 as data.

The multiplexer 404 may receive other signals (e.g., a polling set or reset signals) as select inputs. The polling set and reset signals, when asserted, may serve as select signals for the multiplexer 404. When the polling set signal is asserted, the multiplexer 404 outputs the data provided by the polling state machine 402 to the multiplexer 404, which indicates whether ports $P_0$-$P_{63}$ are available to receive data. Alternatively, when the polling reset signal is asserted, the multiplexer 404 outputs the reset data input by the multiplexer 404. If neither the polling set nor the polling reset signal is asserted, the multiplexer 404 outputs the data input by the multiplexer 404 via the feedback loop 405, which represents the previous output of the multiplexer 404. The multiplexer 404 is coupled to and outputs data to a latch 406 (e.g., a set of latches).

The data mover control 120 may include a register 408, such as a programmable register (e.g., a memory mapped input/output (mmio) register), for storing a polling surface cycle value and logic 410 for counting the number of bytes (e.g., a byte count) of data transmitted from the asynchronous buffer 108 to a previously selected port $P_0$-$P_{63}$. The value of the polling surface cycle is less than or equal to the number of bytes transmitted to a port during a data transmission. As stated, in one or more embodiments, 64 bytes of data are transmitted from the transmit buffer 104 to the physical layer interface 118 via the asynchronous buffer 108 during a data transmission. Therefore, the polling surface cycle value is less than or equal to 64. The value of the polling surface cycle register 408 and the byte count logic 410 are output to compare logic 412. The signal (e.g., a set signal) output by the compare logic 412 changes state when the polling surface cycle input by the compare logic 412 equals the byte count 410 input by the compare logic 412. For example, the compare logic 412 may output a signal of a high logic state when the polling surface cycle value equals the byte count (e.g., when the amount of data that may be transmitted in the number of transfer cycles indicated by the value of the polling surface cycle equals the amount of data transmitted from the asynchronous buffer 108 to the physical layer interface 118). Otherwise, the output of the compare logic 412 is of a low logic state.

The compare logic 412 may be coupled to OR logic 414. More specifically, the compare logic 412 outputs a set signal to the OR logic 414. An indication (e.g., a FIFO empty signal) that an internal buffer 124 of a port $P_0$-$P_{63}$ to which data is being transmitted is empty may be output to the OR logic 414 as well. The set signal and the FIFO empty signal thus serve as input data signals for the OR logic 414. The OR logic 414 performs a logic OR operation on the input data signals and outputs the polling set signal (described above) to the multiplexer 404.

The polling surface cycle value may indicate a poll side surface point when the polling responses output to the multiplexer 404 by the polling state machine 402 are output by the multiplexer 404 to the latch 406, and thereafter sent to the next port select logic 106. In one embodiment, the value of the polling surface cycle may be four to six cycles prior to the end of a data transmission (e.g., a POS-PHY burst) to a previously-selected port $P_0$-$P_{63}$. In this manner, the data output to the next port select logic 106 by the multiplexer 404 via the latch 406 is an accurate indication of which ports $P_0$-$P_{63}$ included in the physical layer interface 118 are available to receive data during the next data transmission. Other polling surface cycle values may be employed.

Likewise, if the FIFO empty signal input by the OR logic 414 is asserted, the polling set signal input by the multiplexer 404 is asserted and the polling responses output to the multiplexer 404 by the polling state machine 402 are output by the multiplexer 404 to the next port select logic 106 via the latch 406. In this manner, the previously selected port $P_0$-$P_{63}$ may be selected to receive data, and thereafter, data may be transmitted to that port $P_0$-$P_{63}$ in an effort to prevent an underrun on the port $P_0$-$P_{63}$.

As stated, the value of the data stored in the latch 406 is sent to the next port select logic 106. More specifically, the data stored in the latch 406 is sent to next port selection logic 416 of the next port select logic 106. Because the next port select logic 106 is included in a first clock domain (e.g., a 200 MHz clock domain) and the data mover control logic 120 is included in a second clock domain (e.g., a 50 MHz clock domain), the polling response data is transmitted to the next port selection logic 416 via two sets of latches 418, 420. More specifically, due to metastability issues, sending the data through two sets of latches 418, 420 after crossing a clock domain boundary (e.g., from an asynchronous clock domain to a synchronous clock domain, or vice versa) ensures the stability and accuracy of the data. The polling response data may be transmitted from the latch 420 to next port selection logic 416. Based on the polling responses (e.g., a 64-bit vector) received by the next port selection logic 416 and a previously-selected port to which data was transmitted, the next port selection logic 416 selects an available port to which to send data.

The next port select logic 106 may include compare logic 422. The first clock domain includes a register 424 (e.g., a memory mapped input/output (mmio) register) for storing a selection surface cycle value and byte logic 426 for counting the number of bytes (e.g., a byte count) transmitted from the asynchronous buffer 108 to a selected port $P_0$-$P_{63}$. The register 424 may be programmable, for example, by a user. The register 424 is coupled to and outputs the selection surface cycle value to the compare logic 422. The selection surface cycle value may be less than or equal to the number of bytes transmitted to a port during a data transmission (e.g., 64 bytes). Likewise, the byte logic 426 is coupled to and outputs data to the compare logic 422. The compare logic 422 asserts an output signal when the selection surface cycle value equals the byte count value. For example, the compare logic 422 may output a signal of a high logic state when the selection surface cycle equals the byte count. Otherwise, the output of the compare logic 422 is of a low logic state.

The selection surface cycle register 424 may indicate a select side surface point when the polling responses outputted by the multiplexer 404 are the reset data input by the multiplexer 404 (e.g., all polling responses are zero). The value of the selection surface cycle may be two to three cycles after the start of a data transmission (e.g., a POS-PHY burst) to a selected port $P_0$-$P_{63}$. Therefore, when the selection surface cycle value equals the byte count stored in byte count register 426 (e.g., when the amount of data that may be transmitted in the number of transfer cycles indicated by the value of the selection surface cycle equals the amount of data transmitted from the asynchronous buffer 108 to the physical layer interface 118), the polling responses output by the multiplexer 404, and thereafter sent to the next port select logic 106 via latch 406, are the reset data. Such polling responses indicate that no port is available to receive data, and therefore the next port select logic 106 will not select a new port to receive data. In this manner, the polling side surface point and the select side surface point may be configured to form a window around the start of cell (SOC) signal.

The compare logic 422 is coupled to and outputs a signal to a latch 428 and a duration counter 430. The latch 428 stores the signal (e.g., a set signal) output by the compare logic 422. This same signal is output by the compare logic 422 to the duration counter 430 and serves to reset the duration counter 430 when the output of the compare logic 422 is stored in the latch 428.

The first clock domain of the network processor 100 also may include a register 432 (e.g., a memory mapped input/output (mmio) register) for storing a duration value. The register 432 may be programmable, for example, by a user. The duration value indicates the number of cycles the reset signal provided to the latch 428 must be held to enable the reset signal to cross the clock domain boundary. More specifically, the duration counter 430 and the duration register 432 output data to compare logic 434, which is coupled to and outputs a signal to the latch 428. The duration counter 430 may increment once per clock cycle (of the first clock domain) and when the compare logic 434 determines the value of the duration counter 430 equals the value of the duration register 434, the compare logic 434 outputs and holds a signal to the latch 428 that serves to reset the latch 428.

The data stored in latch 428 is input by the multiplexer 404 of the data mover control 120 via two latches 436, 438 and serves as a reset signal described above. Due to metastability issues, sending the data through the two latches 436, 438 after crossing a clock domain boundary ensures the stability and accuracy of the data.

In this manner, after a predetermined amount of data is transmitted to a selected port $P_0$-$P_{63}$, the polling responses transmitted from the data mover control logic 120 to the next port select logic 106 are the reset data (e.g., all bits of the polling responses are zero). Therefore, the next port selection logic 416 will not select a port to receive data, because the polling responses indicate that no ports $P_0$-$P_{63}$ are available to receive data. Consequently, the next port select logic 106 will not select a new port $P_0$-$P_{63}$ to receive data from the transmit buffer 104 via an asynchronous buffer 108 and the physical layer device 110-116 while data is beginning to be transmitted to a port.

The foregoing description discloses only exemplary embodiments of the invention. Modifications of the above-disclosed embodiments of the present invention, which fall within the scope of the invention, will be readily apparent to those of ordinary skill in the art. For instance, while the next port select logic 106 of the present invention was described with reference to a round robin selection algorithm, other selection algorithms may be used. Although in one embodiment, sixty-four bytes of data are transmitted to a selected port, a larger or smaller amount of data may be transmitted to each selected port in other embodiments.

In addition to multiplexed-status polling and direct status indication mechanisms for determining which ports are available to receive data, other indication mechanisms may be used in other embodiments. A larger or smaller number of ports and physical layer devices may be employed than those described herein.

Accordingly, while the present invention has been disclosed in connection with exemplary embodiments thereof, it should be understood that other embodiments may fall within the spirit and scope of the invention as defined by the following claims.

The invention claimed is:

1. A method for controlling the flow of data between a first and second clock domain comprising:

selecting one of a plurality of ports included in a physical layer interface in the second clock domain to which to send data; and transmitting data from a transmit buffer in the first clock domain to the selected port in the physical layer interface in the second clock domain, wherein selecting one of the plurality of ports included in the physical layer interface in the second clock domain to which to send data includes:

polling each of the plurality of ports in the physical layer interface in the second clock domain to determine polling results indicating available ports which may receive data;

sending the polling results to the first clock domain; and selecting, in the first clock domain, a port from the available ports included in the physical layer interface in the second clock domain to which to send data, and wherein sending the polling results to the first clock domain includes sending the polling results to the first clock domain after a predetermined portion of a previous data transmission from the transmit buffer in the first clock domain to the selected port in the physical layer interface in the second clock domain is complete.

2. The method of claim 1 wherein transmitting data from the transmit buffer in the first clock domain to the selected port in the physical layer interface in the second clock domain includes:

transmitting data for the selected port from the transmit buffer to an asynchronous buffer;

transmitting the data from the asynchronous buffer to an internal buffer of a physical layer device included in the physical layer interface, the physical layer device including the selected port; and transmitting the data from the internal buffer of the physical layer device to the selected port.

3. The method of claim 2 further comprising resetting the polling results after a predetermined portion of a data transmission from the asynchronous buffer to the selected port in the physical layer interface in the second clock domain is complete.

* * * * *